United States Patent [19]

Fennemann

[11] Patent Number: 4,766,104

[45] Date of Patent: * Aug. 23, 1988

[54] PROCESS FOR PRODUCING A $V_2O_5$-AND-ALKALI-METAL-SULFATE-CONTAINING CATALYST FOR OXIDIZING $SO_2$ TO $SO_3$

[75] Inventor: Wolfgang Fennemann, Karben, Fed. Rep. of Germany

[73] Assignee: Metallgesellschaft Aktiengesellschaft, Frankfurt am Main, Fed. Rep. of Germany

[*] Notice: The portion of the term of this patent subsequent to Jul. 14, 2004 has been disclaimed.

[21] Appl. No.: 48,058

[22] Filed: May 8, 1987

Related U.S. Application Data

[63] Continuation-in-part of Ser. No. 693,089, Jan. 22, 1985, Pat. No. 4,680,281.

[30] Foreign Application Priority Data

Jan. 19, 1984 [DE] Fed. Rep. of Germany ....... 3401676

[51] Int. Cl.$^4$ .................. B01J 23/22; B01J 27/055
[52] U.S. Cl. .................................... 502/218; 502/344
[58] Field of Search .................. 502/344, 353, 218; 423/535

[56] References Cited

U.S. PATENT DOCUMENTS 3,216,953  11/1965  Krempff ......................... 502/247 X
4,431,573   2/1985  Fennemann et al. ............... 502/218

FOREIGN PATENT DOCUMENTS 808639  3/1957  United Kingdom ............... 423/535
432921  6/1974  U.S.S.R. ............................ 502/344

Primary Examiner—W. J. Shine
Attorney, Agent, or Firm—Herbert Dubno; Jonathan Myers

[57] ABSTRACT

A catalyst is produced in two stages in that prefabricated carrier bodies are impregnated with solutions which contain vanadium and alkalies. When the impregnated carrier bodies have been dried, the conversion activity of the catalyst is increased further in that the catalyst is activated under oxidizing conditions at a temperature of 700° C. to 1000° C.

6 Claims, No Drawings

PROCESS FOR PRODUCING A V₂O₅-AND-ALKALI-METAL-SULFATE-CONTAINING CATALYST FOR OXIDIZING SO₂ TO SO₃

CROSS REFERENCE TO RELATED APPLICATION

This application is a continuation in part of Ser. No. 693,089 filed Jan. 22, 1985, now U.S. Pat. No. 4,680,281.

FIELD OF THE INVENTION

My present invention relates to a process for producing a vanadium oxide and alkali metal catalyst for the oxidation of $SO_2$ to $SO_3$ in which carrier bodies are impregnated with solutions that contain vanadium and alkalies and the carrier bodies are subsequently dried at elevated temperatures.

BACKGROUND OF THE INVENTION

The impregnation of prefabricated carrier bodies affords various advantages over the production of a catalyst in a single process stage, in which the carrier material and the active materials are mixed and are subsequently shaped to catalyst bodies.

The prefabricated carrier bodies usually consist of $SiO_2$ and can be produced without restriction as to the active substances. As a result, carrier bodies that are uniform in composition and have a large internal surface area and a high mechanical strength can be made. The impregnation results in a uniform distribution of the active substances throughout the carrier bodies so that the resulting catalyst bodies are uniform in composition and rejection of poor quality products is avoided. The catalysts have high conversion activities.

The production of catalysts by an impregnation of prefabricated carrier bodies has been described in commonly assigned U.S. Pat. No. 4,431,573 of Feb. 14, 1984 and corresponding German patent document-open application DE-OS No. 30 33 319. The carrier bodies in this system are impregnated with an impregnating solution which contains 600 to 1100 grams $H_2SO_4$ and 140 to 830 grams $V_2O_5$ and alkali metal sulfate per liter. The impregnation is effected at a temperature between 60° C. and the boiling temperature of the impregnating solution. The impregnated carrier bodies are dried with agitation at a temperature of up to 700° C. The catalysts have high conversion activities even at low temperatures and are mechanically stable even at high temperatures.

German Application No. 30 22 894 describes such a process for the production of catalyst for use in a fluidized bed. In that process the carrier bodies do not contain $Al_2O_3$ in excess of 4% and are impregnated with a solution which has a low sulfuric acid content and contains vanadyl oxysulfate and potassium hydrogen sulfate. In this solution vanadium is present in tetravalent form. The impregnation is followed by drying at a temperature of 150° C. to 250° C. The carrier bodies or the impregnated carrier bodies are hardened at a temperature which is not in excess of 600° C. and preferably between 200° and 400° C.

Catalysts may also be produced in a two-stage process comprising an impregnation with alkaline or neutral solutions (German Patent Publication No. 12 81 407, German patent document-open application DE-OS No. 15 42 177, Austrian patent No. 116, 361, U.S. Pat. No. 1,941,426; B. Waeser "Die Schwefelsaurefabrikation", 1961, Verlag Friedrich Wieweg und Sohn, Brunswick, Germany pages 252 to 258). This process however, involves an attack of the alkaline solution on the $SiO_2$ content of the carrier bodies. If neutral solutions are employed, the poor solubility of the active substances requires an impregnation in a plurality of stages so that it is difficult to adjust a uniform content of active substances.

OBJECT OF THE INVENTION

It is the object of my invention further to increase the conversion activity of catalysts made in two stages by an impregnation of prefabricated carrier bodies.

DESCRIPTION OF THE INVENTION

This object is attained in accordance with the invention by activating the dried catalyst under oxidizing conditions at a temperature between 700° C. and 1000° C. The temperature between 700° C. and 1000° C. must be present within the catalyst. The optimum temperature is a temperature at which all active substances are molten and which does not exceed the highest permissible temperature of the carrier bodies, i.e. the temperature at which their internal surface area is altered or the surface-change threshold. The highest permissible temperature may depend on the time of action.

If the temperature rises at a high rate, a higher temperature will be permissible than in the case of a slower temperature rise.

The highest permissible temperature may also depend on the composition of the impregnating solution if the chemical attack of the impregnating solution on the carrier bodies increases in intensity as the temperature rises. The optimum temperature for a given catalyst is determined by a determination of the conversion activity.

Preferably the dried catalyst bodies are activated at a temperature of 750° to 1000° C., more preferably at 750° to 950° C.

The carrier bodies, after drying, contain between 9.1569 and 37.4061% by weight of catalytically active vanadium salt such as vanadium sulfate.

Before alkali-impregnated carriers bodies are activated, the active substances must be acidified. Such acidification is not required after an impregnation with an acid solution or with sulfatic active substances in a neutral solution.

The term "oxidizing conditions" means that the gas atmosphere must have an oxidizing activity on the active substances, particularly as the catalyst is cooled.

The activation can be effected as a separate step when the impregnated catalyst has been dried. The drying and activating steps may be carried out in succession in a common piece of equipment, e.g. in a rotary kiln or on a belt after a preliminary drying effected with agitation.

Alternatively, the impregnating, drying and activating steps may be performed in a single piece of equipment, such as a rotary kiln. Heating may be effected with flue gases in direct contact with the catalyst if said gases have an oxidizing activity. Heating may also be effected by an indirect heat exchange. In the latter case the resulting $SO_2$-containing atmosphere must be exhausted to provide oxidizing conditions by an ingress of air, for example.

In accordance with a preferred further feature the activation is effected at a temperature between 750° C. and 950° C. A particularly effective activation will be achieved by a treatment in that temperature range.

In accordance with a further preferred feature the activation is effected with countercurrent flows of the catalyst and the gas temperature and/or with an exhausting of the gas atmosphere.

The gas atmosphere is introduced into the activating unit from its discharge end or is correspondingly exhausted. That practice will result in a particularly effective activation because the catalyst will be exposed to a reliably oxidizing gas temperature as the temperature rises and drops.

In accordance with yet a further preferred feature the catalyst is held at the predetermined activating temperature for 5 to 120 minutes. The residence time at this temperature will depend on the highest temperature. The residence time will be longer at a lower temperature and will be shorter at a higher temperature. This practice will result in a particularly effective actication.

In accordance with a still further preferred feature the process is applied to the activation of a dried catalyst produced by an impregnation of carrier bodies with acid solutions which contain alkali metal sulfate, vanadium sulfate and free sulfuric acid. This practice will result in a particularly effective activation because the $SiO_2$ content of the carrier bodies will not be attacked by the impregnating sulfuric acid solutions. The process disclosed in U.S. Pat. No. 4,431,573 and German Application No. 30 33 319 is particularly effective.

SPECIFIC EXAMPLES

The invention will be explained more fully with reference to the following Examples.

EXAMPLE 1

In accordance with German Application No. 30 33 319, a catalyst was produced on a laboratory scale as follows:

A commercially available $SiO_2$ carrier (spherical bodies 5.3 mm in diameter) was impregnated with an impregnating solution containing
 152.5 g/l $V_2O_5$
 310.2 g/l $K_2SO_4$
 113.7 g/l $Cs_2So_4$
 900 g/l $H_2SO_4$ The impregnating solution was used in excess and was decanted after having acted for 20 minutes. The carriers had a liquid absorption capacity of 720 ml per kg of carrier.

With a liquid absorption capacity of 720 ml/kg of carrier and each kg of carrier picking up, following drying as described below, 0.14 kg of $V_2O_5$ and alkali metal sulfates, together forming the active material, (corresponding to an active material content in the impregnating solution of 140 grams per liter), the active material proportion in the dried bodies will be 9.1569% by weight.

Correspondingly, with a liquid absorption capacity of 720 ml/kg of carrier and each kg of carrier picking up, following drying as described below, 0.83 kg of $V_2O_5$ and alkali metal sulfates, together forming the active material), (corresponding to an active material content in the impregnating solution of 140 grams per liter), the active material proportion in the dried bodies will be 37.4061% by weight.

When the dried bodies thus have active material proportions in the range of 9.1569% to 37.3061% by weight, especially effective results can be obtained upon activation in accordance with the principles of the invention.

The carrier bodies were then partially dried with agitation in a tumbling evaporator at 150° C. in a vacuum produced by water jets and were finally dried in a second step in a drying cabinet at 300° C. and normal pressure.

Part of the catalyst was aftertreated in that it was placed at room temperature in a thin layer into a bowl, which was then introduced into a muffle furnace, which was at room temperature, and was subsequently heated to 750° C. in 75 minutes. By comparison measurements it was found that the difference between the measured gas temperature and the temperature in the interior of the catalyst is relatively small and amounts to 15° to 20° C. during the temperature rise and reaches values below 5° C. after a holding time of about 5 minutes.

After a holding at 750° C. for half an hour, the muffle furnace was opened and the bowl of the catalyst was taken and permitted to cool in the air.

Activity measurements had the following results:

|  | $SO_2$ conversion % | at °C. |
| --- | --- | --- |
| Catalyst dried at 300° C. | 98.82 | 415 |
| Catalyst aftertreated at 750° C. | 99.06 | 405 |

This shows that the activity was distinctly and significantly improved by the aftertreatment.

EXAMPLE 2

The process of Example 1 was repeated but the impregnating solution was used in a measured rather than an excessive amount.

The carrier bodies agitated in the tumbling evaporator at 110° C. were supplied with the measured amount of the impregnating solution in such a manner that the solution was distributed as uniformly as possible. In order to ensure that the impregnating solution was completely absorbed by the carriers, the amount of the impregnating solution was restricted to 90% of the maximum liquid absorption capacity of the carriers. The contents of the active substances in the impregnating solution were correspondingly increased so that the finished catalyst has the same contents of active substances as the catalyst produced in Example 1. 650 ml of an impregnating solution having the following composition were used per kg of the carriers:
 168.9 g/l $V_2O_5$
 343.6 g/l $K_2SO_4$
 125.9 g/l $Cs_2SO_4$
 900 g/l $H_2SO_4$ The carrier bodies were dried in a vacuum in the same tumbling evaporator immediately after the impregnation. The further treatment was the same as in Example 1 and the results were also the same as those obtained in Example 1.

EXAMPLE 3

The process of Example 2 was repeated. The drive of the tumbling evaporator was interrupted during the impregnation so that part of the impregnating solution was supplied to the carrier bodies when they were at rest. This resulted in a highly irregular distribution, which was apparent from different colors of the carrier bodies. The drying resulted in a mixture of catalyst parts having greatly varying contents of active substances.

The further treatment was the same as in Examples 1 and 2. The following results were obtained:

|  | SO$_2$ conversion % | at °C. |
|---|---|---|
| Catalyst dried at 300° C. | 98.41 | 420 |
| Catalyst aftertreated at 750° C. | 99.06 | 405 |

As was to be expected, the disturbance of the impregnating step had the result that the merely dried catalyst had a lower conversion activity than the catalyst obtained by the optimum treatment in Examples 1 and 2. That difference in quality was entirely compensated by the aftertreatment, which resulted in the same final quality as was achieved in Examples 1 and 2. The carrier bodies were uniform in color.

This shows that the use of the aftertreatment permits the entire production of the catalyst to be simplified because the results of a processing which is not perfectly optimum on the quality of the catalyst will be compensated by the aftertreatment. As a result, the economy of the catalyst production is increased because charges which must be rejected will be virtually avoided.

EXAMPLE 4

The unsatisfactory charge obtained in Example 3 was used for a detailed investigation of the influence of the conditions of the aftertreatment. As has been described in Example 1, the aftertreatment comprised in each case:
placing the sample into the muffle furnace at room temperature
Raising the temperature to the desired treating temperature
Holding at the treating temperature
Taking the hot sample after the treatment for the desired time and cooling of air.

The following heating-up times were determined in dependence on the treating temperatures:

| Treating temperature °C. | Heating-up time min |
|---|---|
| 600 | 58 |
| 650 | 63 |
| 700 | 68 |
| 750 | 75 |
| 800 | 79 |
| 850 | 86 |
| 900 | 94 |
| 950 | 102 |
| 1000 | 112 |

The influence of the treating conditions is apparent from the following table:

| Temp. °C. | Time h | SO$_2$ Conversion % | at °C. |
|---|---|---|---|
| — | — | 98.41 | 420 |
| 600 | 2 | 98.49 | 420 |
| 600 | 6 | 98.68 | 415 |
| 600 | 20 | 98.82 | 415 |
| 600 | 260 | 98.86 | 415 |
| 650 | 0.5 | 98.72 | 415 |
| 650 | 2 | 98.85 | 410 |
| 700 | 0.5 | 99.00 | 410 |
| 700 | 2 | 99.04 | 410 |
| 750 | 0.5 | 99.06 | 405 |
| 750 | 2 | 99.06 | 405 |
| 800 | 0.5 | 99.06 | 405 |
| 850 | 0.5 | 99.02 | 410 |
| 900 | 0.5 | 99.00 | 410 |
| 950 | 0.5 | 98.82 | 415 |
| 1000 | 0.5 | 98.40 | 425 |
| 1000 | 2 | 98.12 | 440 |

This shows that the activity is progressively increased as the temperature increases up to an optimum temperature between 750° C. and 800° C. and that the conversion activity decreases as the temperature is increased above that optimum value.

The influence of temperature is increased by the time of the treatment but this is only of secondary importance.

EXAMPLE 5

The systematic investigation apparent from Example 4 was repeated with a different catalyst of lower activity. That catalyst differed from the one used in Example 4 in that it was made with a different carrier material. The contents of active substances in per cent by weight was the same. The carrier material which was used was different in several respects:
A different SiO$_2$ raw material was used, which had a B.E.T. surface area that was only about 1/10 of that of the carrier material used in Example 4 (15 m$^2$/g rather than 150 m$^2$/g).
The geometric shape (cylinder) and the dimensions were different so that the geometrical surface area was smaller by about 20%.
The production process (shaping, tempering, etc.) was different.

The aftertreatment was performed in some cases in the muffle furnace in the manner described in Examples 1 and 4, with a holding time of ½ hour, and in other cases, for comparison, in an indirectly heated rotary kiln.

For this purpose a sample of 1 liter of catalyst was filled into a rotary kiln of steel and was heated from room temperature to the treating temperature and was held at the treating temperature for ½ hour. After the treating time the hot sample was immediately removed from the rotary kiln and was permitted to cool in air. An air stream for carrying away the evolved gases was passed through the rotary kiln. In another test series the air stream was replaced by synthetically produced flue gas (9 vol. % H$_2$O, 9 vol. % CO$_2$, 7 vol. % O$_2$, 75 vol. % N$_2$).

The measurement of the activity of the catalysts thus pretreated (the holding temperature was ½ hour in all cases) had the following results:

| Treating Conditions | | | Conversion | Activity |
|---|---|---|---|---|
| Temp. | Equipment | Atmosphere | % | at °C. |
| — | — | — | 95.7 | 460 |
| 725 | muffle | air | 97.8 | 435 |
| 725 | rotary kiln | air | 98.03 | 430 |
| 725 | rotary kiln | flue gas | 98.20 | 425 |
| 775 | muffle | air | 98.07 | 425 |
| 775 | rotary kiln | air | 98.17 | 425 |
| 775 | rotary kiln | flue gas | 98.30 | 425 |
| 825 | rotary kiln | air | 98.47 | 420 |

-continued

| Treating Conditions | | | Conversion | Activity |
| --- | --- | --- | --- | --- |
| Temp. | Equipment | Atmosphere | % | at °C. |
| 825 | muffle | air | 98.33 | 425 |
| 825 | rotary kiln | flue gas | 98.59 | 420 |
| 875 | muffle | air | 98.60 | 420 |
| 875 | rotary kiln | flue gas | 98.46 | 420 |
| 925 | muffle | air | 98.32 | 430 |
| 975 | muffle | air | 97.9 | 440 |
| 1025 | muffle | air | 96.5 | 450 |

The results show:

(a) The increase in activity due to the activating treatment is different for different catalysts. The lower the activity of the catalyst before the aftertreatment, the larger will be the influence of the aftertreatment:

Catalyst of Example 4: From 98.41 to 99.06
Catalyst of Example 5: From 95.74 to 98.60

(b) The optimum temperature of the aftertreatment is different for different catalysts:

Catalyst of Example 4: 750° to 800° C.
Catalyst of Example 5: 825° to 875° C.

(c) Different units of equipment will produce different results. The values obtained with the rotary kiln are generally somewhat higher than those obtained with the muffle furnace. This is specific for the equipment.

(d) Indirect or direct heating may be employed. Flue gas has a rather favorable influence on the activity of the catalyst.

EXAMPLE 6

The catalyst was produced in batches of 400 liters in a Technikum plant. The carrier material and the impregnating solution were comparable to those used in Example 2. The carrier material was preheated to 100° and 120° C. in a rotary kiln directly heated with a gas burner. During the rotation of the rotary kiln the impregnating solution was sprayed onto the carrier material and the catalyst was subsequently dried by means of the gas burner. For this purpose the flue gas temperature was increased to about 500° C. in about 3 hours, held at the value for 1 hour. The burner was then shut down and air was sucked through the rotary kiln for about 2 hours to cool the catalyst until the exhaust gas had a temperature of 100° C. to 150° C. The catalyst was then removed. The aftertreatment was carried out in a second rotary kiln, which was indirectly heated and continuously operated. At a rate of about 30 kg/h the catalyst was continuously charged by a metering feeder into the rotary kiln at a cold end thereof and the catalyst was passed through the rotary kiln in dependence on its inclination and on the level to which it was filled, etc. The catalyst moved through the entire temperature profile of the rotary kiln in that the catalyst was charged at a low temperature, heated to a maximum temperature and then cooled substantially as it continued its travel in the rotary kiln until it reached the non-heated end of the kiln. The temperature at the hottest portion was regarded as the nominal treating temperature and was automatically controlled. The influences of the gas flow pattern and of temperature were investigated with a view to an optimization of the aftertreatment.

The gas flow pattern was influenced in that a suction was applied to the two ends of the rotary kiln in alternation. When the gas was sucked in a co-current or uniflow direction, i.e. the direction of gas flow was the same as the direction of catalyst travel, the quality of the resulting catalyst was unsatisfactory. In that case the catalyst was cooled under the gas atmosphere which had been produced by the activation ($SO_2$ content several percent by volume) and the $V_2O_5$ content was partly reduced (the catalyst looked green). A catalyst of excellent quality was produced when the gas was sucked in a countercurrent direction. In that case the conditions of activation were comparable to those in the laboratory experiments described in Examples 1 to 5: The activated catalyst was cooled in air with exclusion of the sulfur oxide produced during the activating treatment.

The influence of temperature was investigated in 3 test series conducted in the range from 800° C. to 1100° C. The tests were conducted with constant catalyst throughputs of 15, 30 and 60 kg/h.

The activity measurements had the following results:

| Treating Conditions | | Conversion | Acvitity |
| --- | --- | --- | --- |
| Temp. °C. | Throughput rate kg/h | % | at °C. |
| — | — | 98.80 | 415 |
| 800 | 15 | 99.06 | 410 |
| 850 | 15 | 99.16 | 410 |
| 900 | 15 | 99.00 | 415 |
| 950 | 15 | 98.76 | 420 |
| 1000 | 15 | 97.80 | 440 |
| 800 | 30 | 98.95 | 415 |
| 850 | 30 | 99.05 | 410 |
| 900 | 30 | 99.15 | 410 |
| 950 | 30 | 99.02 | 415 |
| 1000 | 30 | 98.78 | 420 |
| 800 | 60 | 98.86 | 415 |
| 850 | 60 | 98.94 | 415 |
| 900 | 60 | 99.01 | 410 |
| 950 | 60 | 99.14 | 410 |
| 1000 | 60 | 99.12 | 410 |
| 1050 | 60 | 98.98 | 415 |

These results show that the optimum temperature to be used increased with an increase of the throughput rate in this Example from about 850° C. at a throughput rate of 15 kg/h via about 900° C. at a throughput rate of 30 kg/h to about 950° C.–1000° C. at a throughput rate of 60 kg/h.

It is believed that the fact that the conversion activity is higher by an absolute value of about 0.1% than in the case of the material produced on a laboratory scale (see Examples 1 and 4) is due to the favorable flue gas atmosphere and the improved temperature profile in the rotary kiln. That result has already been proved in Example 5.

EXAMPLE 7

Carrier material at a rate of 100 l/h was continuously impregnated in a drum which was heated to about 100° C. and was supplied with carrier bodies and impregnating solution at properly matched rates. The impregnating solution and the carrier material were the same as in Example 2.

The carrier material which had been moistened with the impregnating solution and at a temperature of about 100° C. was transferred over a suitable overflow device from the impregnating drum into a continuously operating rotary kiln at that end which was remote from the burner. The rotary kiln was directly heated with a gas burner.

The flue gases were evacuated by means of a fan so that based on humid gas their $O_2$ content was less than 10 vol. %, 4 to 8 vol. % on the average, and the gases flowed countercurrently to the catalyst.

This operation resulted in a favorable heat transfer. The catalyst was uniformly heated and the flue gases were correspondingly cooled at the same time. When the catalyst had been dried, the aftertreatment was carried out in the same equipment at the same time in that the feeding of the gas was so controlled that the highest catalyst temperature was 850° C. to 900° C.

The catalyst was withdrawn on the burner side and was cooled with air in a succeeding cooling unit. With certain alterations, impregnating and cooling can be effected in the same rotary kiln. The catalyst was comparable in quality to the catalyst produced in Example 6.

Determination of Conversion Activity

The testing equipment consists of jacketed tube, which is provided on the outside with an electric heating coil. As the entering gas flows through the space between the catalyst sample and the heating jacket, the gas is heated to an inlet temperature of about 500° C. The jacket is used to ensure that any local overheating of the catalyst will be precluded. A displaceable thermocouple is disposed in the middle of the catalyst sample. By a change of the heating coil and/or by a change of the heat insulation the temperatures are so adjusted that the temperature gradient is as uniform as possible throughout the sample layer. The temperatures measured 5 cm above the sieve plate supporting the sample is stated as the conversion temperature. The flowing gas passes throughout the temperature range between 500° C. and 380° C. The conversion is determined for decreasing temperatures in intervals of about 10 minutes and the resulting values are plotted on a graph on which the theoretical equilibrium conversion rate is also indicated.

The advantages afforded by the invention reside in that the inherently good conversion activity of a catalyst produced in two stages by an impregnation of prefabricated carrier bodies and intended for the reaction of $SO_2$ to $SO_3$ is considerably increased and variations in quality which occur during the production can be offset to a large extent.

I claim:

1. In a process for producing a catalyst for the oxidation of $SO_2$ to $SO_3$, which comprises impregnating carrier bodies with an acidic solution containing soluble vanadium salt and at least one alkali metal sulfate, and subsequently drying the carrier bodies at an elevated temperature, the improvement which comprises the steps of:

effecting the impregnation of the carrier bodies and the drying such that the carrier bodies after drying contain between 9.1569 and 37.4061 precent by weight of catalytically active substance in the foam of the vanadium salt and the alkali metal sulfate; and activating the dried catalyst bodies by treating them in a countercurrent flow with a gas atmosphere under oxidizing conditions at an activation temperature of 700° C. to 1000° C. for an activation period of 5 to 120 minutes.

2. The improvement defined in claim 1 wherein said activation temperature is 750° C. to 950° C.

3. A catalyst for the oxidation of $SO_2$ to $SO_3$ which consists of carrier bodies containing 9.1569 to 37.4061 of vanadium salt and an alkali metal sulfate and activated as defined in claim 1.

4. In a process for producing a catalyst for the oxidation of $SO_2$ to $SO_3$, which comprises impregnating carrier bodies with a sulfuric acid solution containing soluble vanadium sulfate and at least one alkali metal sulfate, and subsequently drying the carrier bodies at an elevated temperature, the improvement which comprises the steps of:

effecting the impregnation of the carrier bodies and the drying such that the carrier bodies after drying contain between 9.1569 and 37.4061 percent by weight of catalytically active substance in the form of vanadium sulfate and the alkali metal sulfate; and activating the dried catalyst bodies by treating them in a countercurrent flow with a gas atmosphere under oxidizing conditions at an activation temperature of 750° to 1000° C. for an activation period of 5 to 120 minutes.

5. The improvement defined in claim 4 wherein said activation temperature is 750° to 950° C.

6. A catalyst for the oxidation of $SO_2$ to $SO_3$ which consists of carrier bodies containing 9.1569 to 37.4061% by weight of vanadium sulfate and an alkali metal sulfate and activated as defined in claim 4.

* * * * *